United States Patent

Dague et al.

[11] Patent Number: 5,956,213
[45] Date of Patent: Sep. 21, 1999

[54] LATCH MECHANISM FOR DISK DRIVE USING MAGNETIC FIELD OF ACTUATOR MAGNETS

[75] Inventors: Wallis A. Dague, Louisville; Frederick Mark Stefansky, Longmont, both of Colo.

[73] Assignee: Seagate Technology, Inc.

[21] Appl. No.: 08/622,925

[22] Filed: Mar. 27, 1996

Related U.S. Application Data

[63] Continuation of application No. 08/400,463, Mar. 7, 1995, abandoned, which is a continuation of application No. 08/110,539, Aug. 23, 1993, abandoned, which is a division of application No. 07/796,576, Nov. 22, 1991, abandoned, which is a continuation-in-part of application No. 07/549,283, Jul. 6, 1990, abandoned, which is a continuation-in-part of application No. 07/147,804, Jan. 25, 1988, Pat. No. 4,965,684.

[51] Int. Cl.⁶ ..................................................... G11B 5/54
[52] U.S. Cl. ............................................................. 360/105
[58] Field of Search ............................. 360/105, 106, 360/104, 98.01, 97.01, 97.02, 103; 364/200

[56] References Cited

U.S. PATENT DOCUMENTS

| | | | |
|---|---|---|---|
| 5,023,736 | 6/1991 | Kelsic et al. | 360/106 |
| 5,025,335 | 6/1991 | Stefansky | 360/137 |
| 5,025,336 | 6/1991 | Morehouse et al. | 360/97.02 |
| 5,170,300 | 12/1992 | Stefansky | 360/97.01 |
| 5,187,627 | 2/1993 | Hickox et al. | 360/105 |
| 5,313,354 | 5/1994 | Sampietro et al. | 360/105 |
| 5,319,511 | 6/1994 | Jin | 360/105 |
| 5,329,412 | 7/1994 | Stefansky | 360/105 |
| 5,483,399 | 1/1996 | Jeong et al. | 360/105 |
| 5,568,333 | 10/1996 | Bang | 360/105 |

FOREIGN PATENT DOCUMENTS 9001767  2/1990  WIPO ...................................... 360/106

*Primary Examiner*—Allen T. Cao
*Attorney, Agent, or Firm*—Shawn B Dempster; Edward P Heller III

[57] ABSTRACT

A parking device for an actuator in a storage device which includes a voice coil motor having a magnet, providing a magnetic field including a magnetic flux, and a coil coupled to the actuator. The parking device includes a magnetically permeable capture structure forming a path for the magnetic flux and generating a capture region, the capture region being a region of magnetic flux adjacent to the capture structure; and a capture member, having a face plate, coupled to the actuator such that the capture member enters the capture region to park the actuator when the actuator is in a park position. In a further aspect, the parking device includes a magnet structure supporting the magnet, having a top plate and a bottom plate, wherein the capture structure is positioned between the top and bottom plates and forms a magnetic circuit path for the magnetic flux with the magnet, and the top and bottom plates. In yet another aspect, the magnet structure comprises a support post member including an air gap to generate a fringe effect in the magnetic flux to provide the capture region and includes cavities such that the circuit path formed by the structure channels the magnetic flux to the gap.

10 Claims, 9 Drawing Sheets

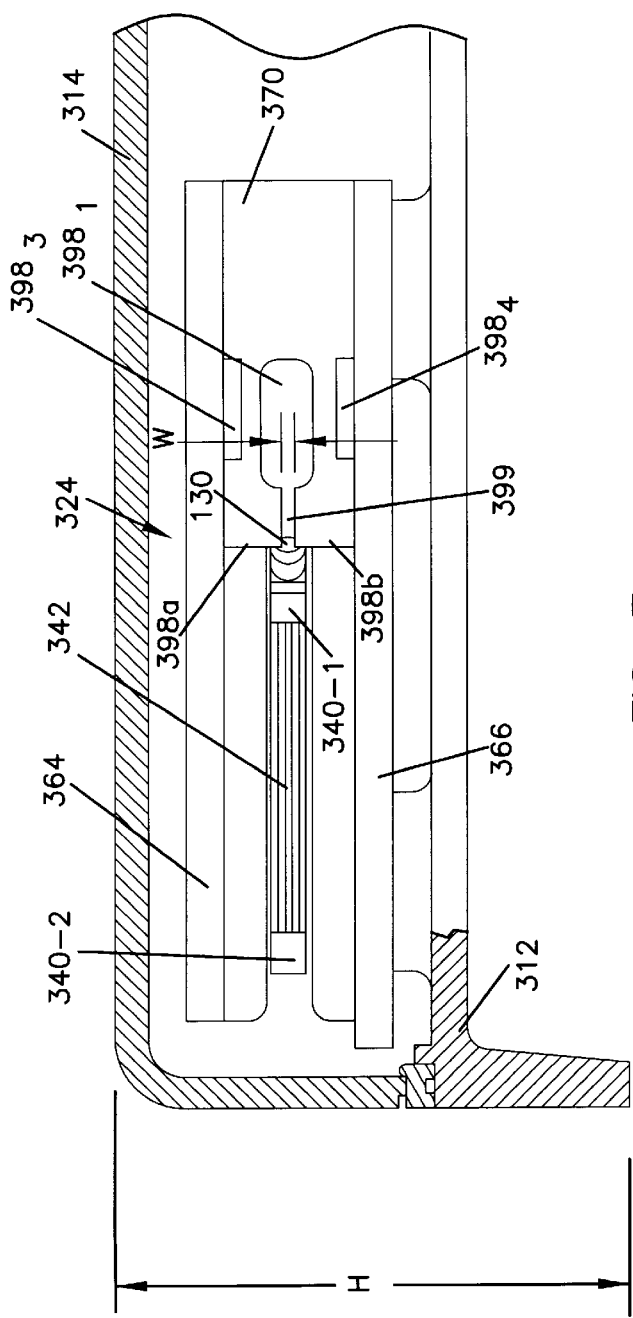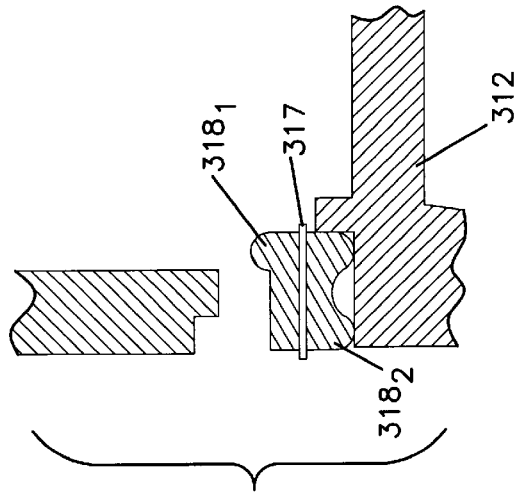
FIG. 6
FIG. 7

Motor Acceleration

ID ──────────────────────── OD

Peak = 57
Loss = 03%

Motor Acceleration

Peak = 62
Loss = 06%

ID ──────────────────────── OD

Motor Acceleration

Peak = 94
Loss = 12%

ID ──────────────────────── OD

LATCH MECHANISM FOR DISK DRIVE USING MAGNETIC FIELD OF ACTUATOR MAGNETS

This application is a continuation of Ser. No. 08/400,463, filed Mar. 7, 1995, now abandoned, which is a continuation of Ser. No. 08/110,539,filed Aug. 23, 1993, abandoned, which is a divisional of application Ser. No. 07/796,576, abandoned, entitled LOW HEIGHT DISK DRIVE, filed Nov. 22, 1991, which is a continuation in part of application Ser. No. 07/549,283, filed on Jul. 6, 1990, abandoned, which is a continuation in part of application Ser. No. 07/147,804, filed Jan. 25, 1988, now U.S. Pat. No. 4,965,684.

CROSS-REFERENCE TO RELATED APPLICATIONS

1) DISK DRIVE SYSTEM CONTROLLER ARCHITECTURE, inventors John P. Squires, Tom A. Fiers, and Louis J. Shrinkle, Ser. No. 057,289, filed Jun. 2, 1987, now U.S. Pat. No. 4,979,056;

2) DISK DRIVE SOFTWARE SYSTEM ARCHITECTURE, inventors John P. Squires, Tom A. Fiers, and Louis J. Shrinkle, Ser. No. 488,386, filed Feb. 23, 1990, which is a continuation of Ser. No. 057,806, filed Jun. 2, 1987, now abandoned;

3) DISK DRIVE SYSTEM CONTROL ARCHITECTURE UTILIZING EMBEDDED REAL-TIME DIAGNOSTIC MONITOR, inventor John P. Squires, Ser. No. 423,719, filed Oct. 18, 1989, now U.S. Pat. No. 4,979,055, which is a continuation of Ser. No. 058,289, filed Jun. 2, 1987, now abandoned;

4) LOW-POWER HARD DISK DRIVE ARCHITECTURE, inventors John P. Squires and Louis J. Shrinkle, filed Aug. 7, 1990, Ser. No. 564,693, which is a continuation of Ser. No. 152,069, filed Feb. 4, 1988, now abandoned;

5) DISK DRIVE SYSTEM USING MULTIPLE EMBEDDED QUADRATURE SERVO FIELDS, inventors Louis J. Shrinkle and John P. Squires, Ser. No. 386,504, filed Jul. 27, 1989;

6) MAGNETIC PARKING DEVICE FOR DISK DRIVE, inventor, Frederick Mark Stefansky, Ser. No. 643,703, filed Jan. 22, 1991, which is a continuation of Ser. No. 269,873, filed Nov. 10, 1988, now abandoned.

7) MULTIPLE MICRO CONTROLLER HARD DISK DRIVE CONTROL ARCHITECTURE, inventors John P. Squires, Charles M. Sander, Stanton M. Keeler, and Donald W. Clay, Ser. No. 07/611,141, filed Nov. 9, 1990.

Each of these related Applications is assigned to the assignee of the subject Application and hereby incorporated by reference.

BACKGROUND OF THE INVENTION

1. Field of the Invention

The present invention relates to disk drives; more particularly, to hard (or fixed) disk drives.

2. Description of the Related Art

Various types of locking (or latch) devices have been used to lock the arm of a voice coil in a particular position when the disk drive is not operating. The trend in latch devices is to utilize a high power unit which is separately assembled to provide reliability. However, high power latch devices generate a large amount of heat which is not desirable in a disk drive or any other area in a computer. Further, the operation of conventional latch devices can be position dependent. Thus, the orientation of the disk drive and the computer in which the disk drive is installed could effect the reliability of the latch device. Such a positional dependence of reliability is not satisfactory for portable computers.

SUMMARY OF THE INVENTION

The present invention comprises a parking device for an actuator and a storage device, such as a disk drive, which generally includes a voice coil motor having a magnet, providing a magnet field and including a magnetic flux, and a coil coupled to the actuator. The parking device includes a magnetically permeable capture structure forming a path for the magnetic flux and including means for generating a capture region. The capture region is a region of magnetic flux adjacent to the capture structure. Also provided is a capture member, having a face plate, which is coupled to the actuator so that the capture member enters the capture region to park the actuator and the actuator is in a parked position.

BRIEF DESCRIPTION OF THE DRAWINGS

FIG. 6 is a cross-sectional view along line 18—18 in FIG. 5;

FIG. 7 is an enlarged, cross-sectional view of the gasket and cover assembly along line 19—19 in FIG. 1.

DESCRIPTION OF THE PREFERRED EMBODIMENTS

Figure 1:
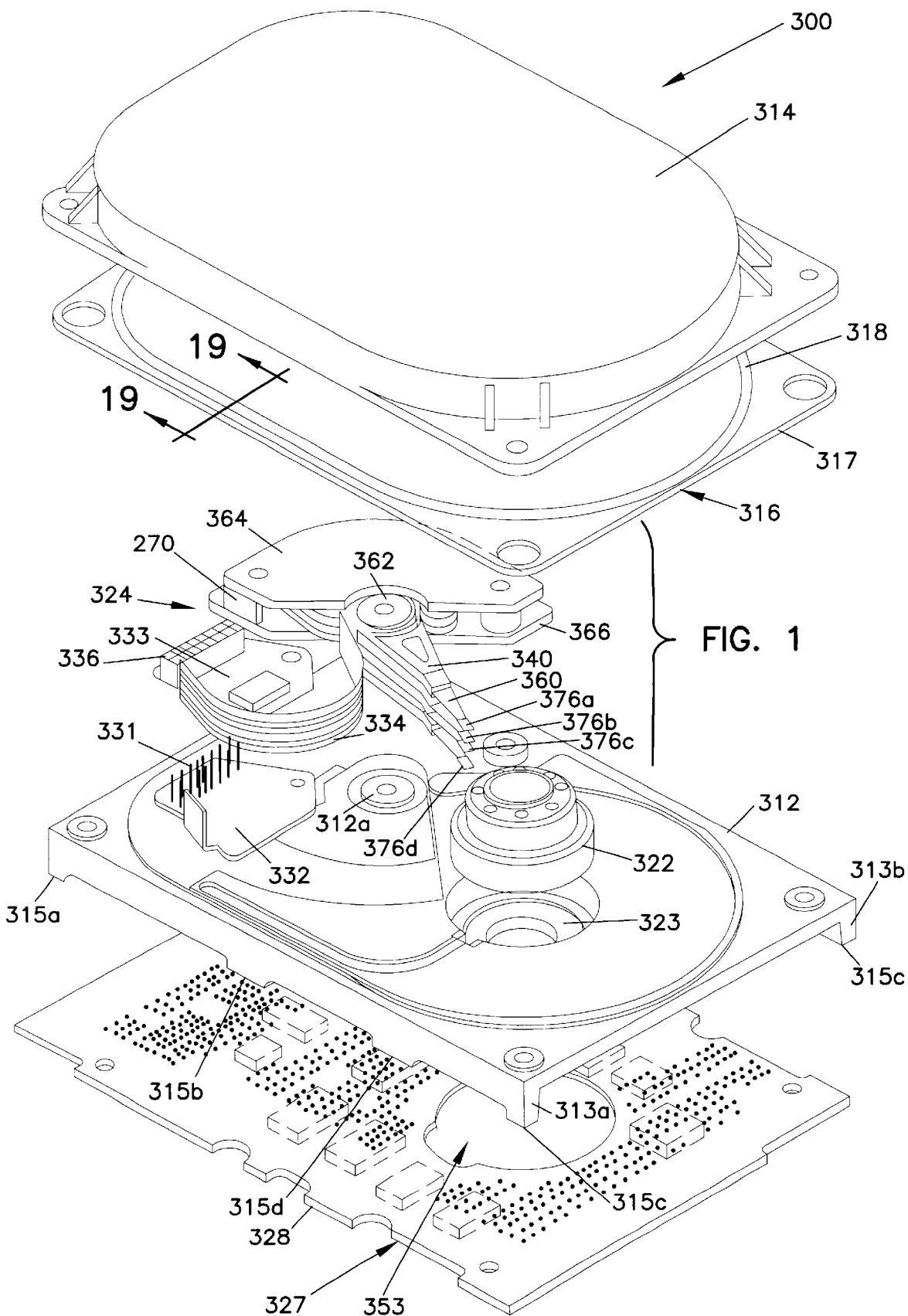
FIG. 1 is an exploded, isometric view of a disk drive according to the present invention.
Figure 2:
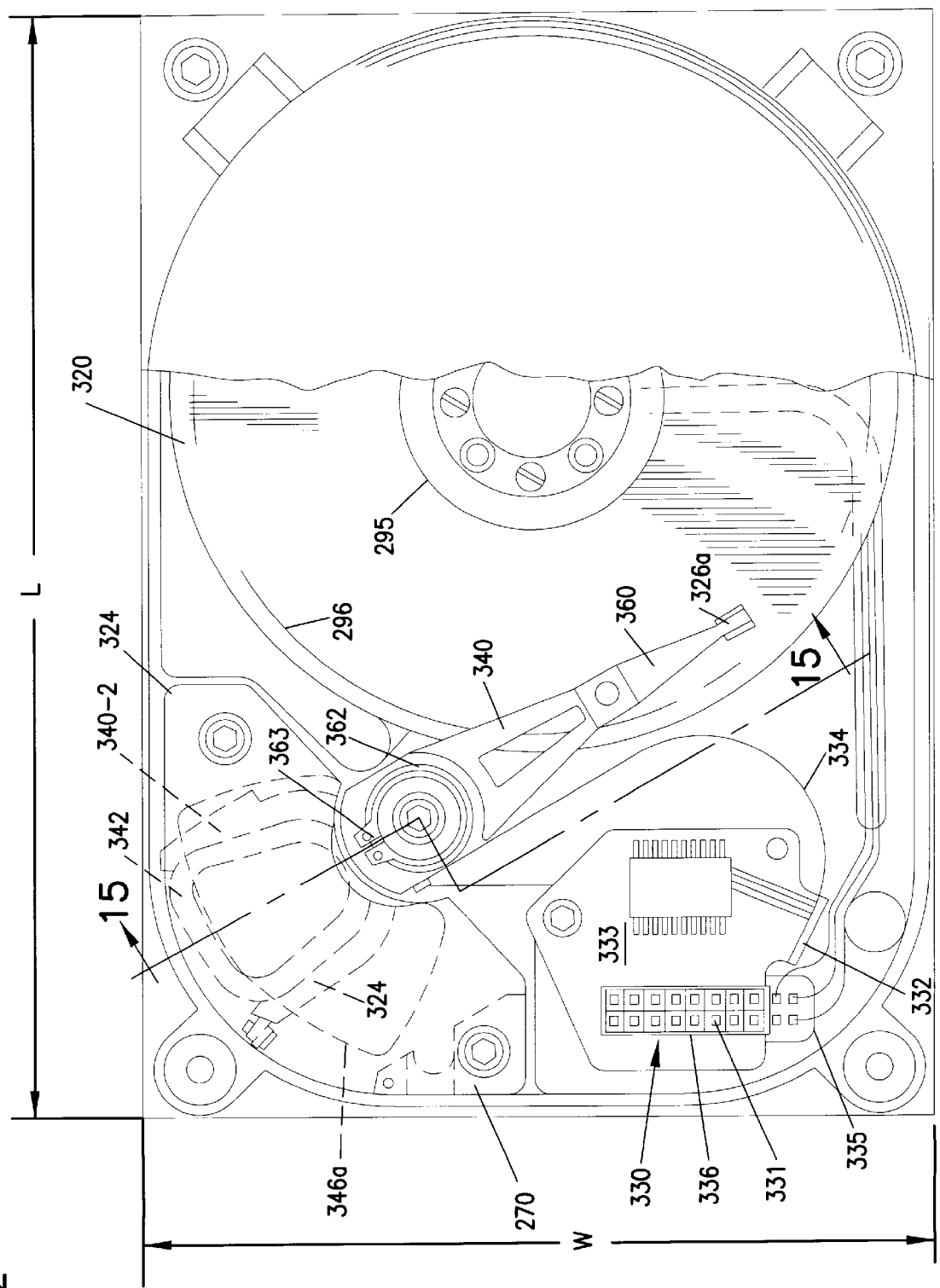
FIG. 2 is a plan view of a disk drive according to the present invention.
Figure 3:
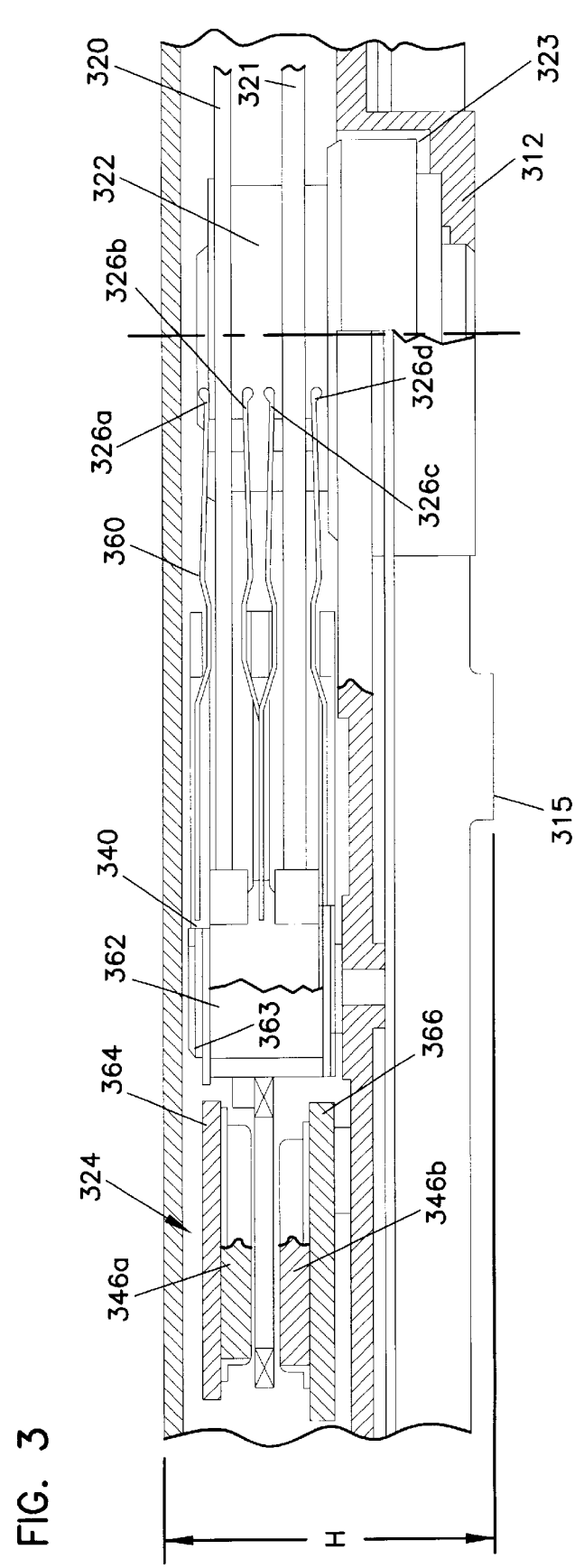
FIG. 3 is a view along line 15—15 in FIG. 2.

A disk drive 300 in accordance with the present invention will be described with reference to FIGS. 1–8.

As shown in FIGS. 1–8, the construction of disk drive 300 includes a base 312 and a cover 314, both generally formed of aluminum. Gasket 316 provides a sealed, controlled environment substantially isolated from ambient atmospheric pressures between base 312 and cover 314. As will be discussed in further detail below, a unique, elastomeric and metal gasket provides improved sealing of the disk drive in accordance with the third embodiment. First and second disks 320, 321 are supported on base 312 and rotated by spin motor 322. Motor 322 is mounted in a well 323 in base 312, thereby allowing lower disk 321 to be as close as possible to the top surface of base 312.

Gasket 316 is formed to have a unique elastomeric and metal structure which provides improved sealing characteristics for disk drive 300 and ease of assembly. Generally, hermetically sealed disk drives utilize gaskets formed entirely of an elastomeric material. As shown in FIGS. 1 and 7, gasket 316 includes a metal layer 317 sandwiched between two elastomeric layers $318_1$ and $318_2$. In one embodiment, layer 317 is formed of stainless steel and layers $318_1$ and $318_2$ are formed of burtyl rubber. The structure of gasket 316 provides easier assembly in the manufacture of disk drive 300 since the stiffness provided by the metal layer allows easier seating of the gasket structure on the base plate than drives using a purely elastomeric gasket. Gasket 316 further provides a seal for the hermetically sealed, controlled environment between cover 314 and base 312. In this regard, gasket 316 has a lateral strength superior to that of purely elastomeric gaskets. The additional stiffness, yielded through use of a high modulus material, such as burtyl rubber, in conjunction with the stainless steel sandwiched layer, improves the drive's resistance to a phenomenon known as "blow out," which can cause a conventional elastomeric gasket of a hermetically sealed drive to deform with changes in external pressure relative to the pressure within hermetically sealed environment.

An actuator assembly 324 positions heads 326a–d with respect to disks 320 and 321; heads 326a and 326b read information from and write information to respective, opposed surfaces of disk 320, and heads 326c and 326d read information from and write information to respective, opposed surfaces of disk 321. Disks 320,321 may comprise plated magnetic disks with an intensity of 1400 Oe. Table 1 below specifies certain characteristics of disks 320 and 321 and heads 326a–d. Heads 326a–326d may comprise thin film, air bearing heads capable of operating at a minimum flying height of 4.3 micro-inch, with a gap width of approximately 7.5 micron, a gap length of approximately 0.4 micron, with a head gram load of approximately 5 grams.

TABLE 1

| | | |
|---|---|---|
| Number of Disks | 2 | |
| Number of Data Surfaces | 4 | |
| Number of Data Cylinders (Tracks per surface) | 2124 | cylinders |
| Sectors per Track | 50 | physical |
| | 49 | accessible |
| Bytes per Sector | 668 | bytes |
| Data Bytes per Sector | 512 | bytes |
| Data Capacity per Data Surface (formatted) | 53.3 | Mbytes |
| Total Data Capacity (formatted) | 213.2 | Mbytes |
| Disk Diameter | 95 | millimeters |
| | 3.74 | inches |
| Data Track Band Width | 0.84 | inches |
| Track Density | 2496 | tracks/inch |
| Bit Density (max) | 30.452 | fci |

Controller 327, including printed circuit board 328 and the circuitry mounted thereon provides control signals to spin motor 322 and actuator assembly 324, and provides data signals to and receives data signals from heads 326a–d, actuator assembly 324 and spindle motor 322. Header 330 provides all electrical connections between controller 327 and the environment between base 312 and cover 314. Header 330 comprises conductive pins 331 embedded in a plastic header 335 which is then potted in base 312. Bracket 332 supports a flex circuit 333, including a reverse flex circuit loop 334, and connector 336 which provides electrical interconnections between flex circuit 333 and pins 331.

Controller 327 may incorporate the system described in the above co-pending application entitled MULTIPLE MICRO CONTROLLER HARD DISK ARCHITECTURE. The third embodiment of the present invention provides a substantial increase in storage capacity within the same physical form factor as the drives of the first and second embodiments by incorporating several different factors. Specifically, the read/write heads used in the present invention, while being of the conventional air-bearing design, utilize a so-called 70% slider, wherein the dimensions of the head and slider have been reduced by approximately 30% from the sliders utilized in the first and second embodiments of the disk drive. In addition, the head gap width has been reduced to approximately 7.5 micron, with a gap length of 0.4 micron. In addition, with an increase in the intensity of the storage media to a 1400 Oe plated disk, and an increase in track density to 2496 tracks per inch, the aforementioned controller architecture allows for an increase in the storage capacity of the disk drive to up to about 213 MBytes, using 49 user sectors and providing a data rate of 20 MBytes/second.

Printed circuit board 328 is mounted to base 312 by mounting screws (not shown), and an insulating sheet (not shown, similar to sheet 255) may be provided between printed circuit board 328 and base 312 to prevent short circuiting of the solder points appearing on the back side 328b of printed circuit board 328 which faces base 312. Printed circuit board 328 has an opening 353, and well 323 protrudes through opening 353.

Printed circuit board 328 may include an interface connector, power connector, and test connecter similar to that utilized the second embodiment of the drive of the present invention.

Figure 8:
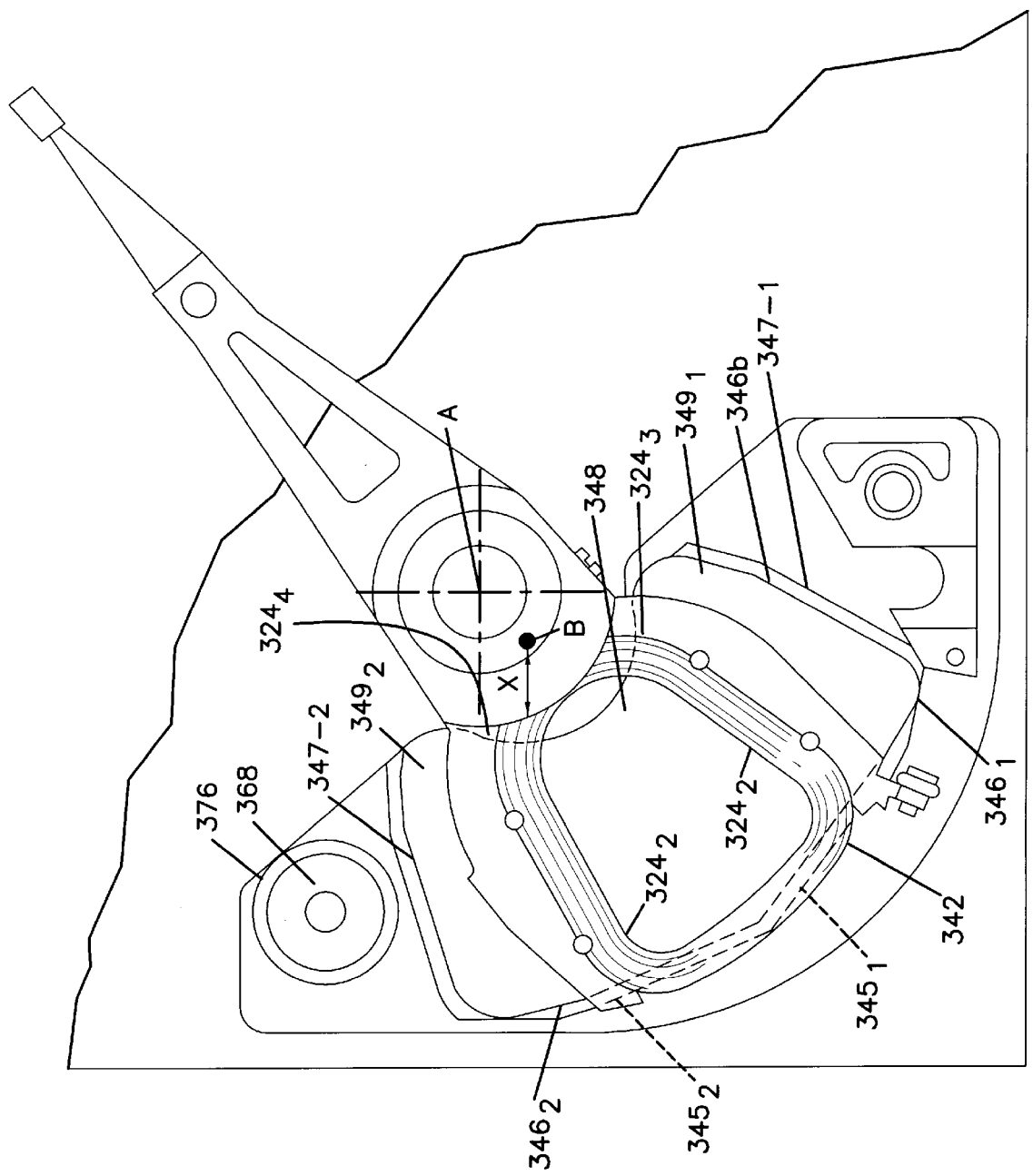
FIG. 8 is a plan view of the actuator assembly of the present invention with the top plate and top magnet removed, detailing the relationship between the actuator coil and actuator magnet construction used therein.

The specific structure, operation, and features of actuator assembly 324 will be explained with reference to FIGS. 2–6 and 8. The function of the actuator assembly 324 is to position heads 326 with respect to the surfaces of disks 320, 321 by pivoting actuator arm assembly 340, and more specifically, to position the heads 326 over individual tracks on disks 320, 321. Heads 326 are supported on actuator arm 340 by load beams 360. A bearing cartridge 362, which is fixed to the base plate 312 at mounting region 312a, is inserted in actuator arm 340 to allow arm 340 to rotate about pivot point "A" (FIG. 8). Actuator arm 340 is attached to bearing cartridge 362 by a clip ring 363. As noted above, using clip ring 363 instead of epoxy allows the bearing cartridge 362 to be tested prior to assembly and cleaned independently of the actuator arm 340. Heads 326 may thus be positioned along an arcuate path at any individual data track between innermost data track 295 and outermost data track 296 by the voice coil motor as described below.

The force utilized to pivot arm assembly 340 is provided by a so-called voice coil motor comprising coil 342 (provided on actuator arms 340-1, 340-2), first and second magnets 346a, 346b, top plate 364, bottom plate 366, support post 368, and latch body 370. Actuator assembly 324 provides a unique coil and magnet design which improves the efficiency of the actuator by providing a relatively constant amount of torque on arm 340 throughout its rotational movement. Top and bottom plates 364 and 366, in conjunction with first support post 368 and latch body 370 create returns for the magnetic fields provided by first and second magnets 346a and 346b. (The general operation of the voice coil motor is described above with respect to the first and second embodiments.) It is important that there are no air gaps between support posts 368, latch body 370 and either the top or bottom plate 364, 366; any air gap would create a discontinuity in the return, greatly reducing the strength of the magnetic field.

First and second magnets 346a, 346b are bipolar, each having a first and second region $346_1$, $346_2$ with opposite poles attached to top plate 364 (e.g., the south pole of first magnet 346a and the north pole of second magnet 346b are attached to top plate 364) to provide first and second magnetic fields $\vec{B}_1$, $\vec{B}_2$ between respective ones of the first and second magnets 346a, 346b and bottom plate 366. First and second magnetic fields $\vec{B}_1$, $\vec{B}_2$ are encompassed in closed magnetic field loops provided by top plate 364, bottom plate 366, support post 368, and latch body 370.

Actuator coil 342 is positioned so that it carries a current in opposite directions in first and second magnetic fields $\vec{B}_1$ and $\vec{B}_2$. The strength of the magnetic field in this region between magnets 346a, 346b is directly related to the torque which the voice coil exerts on the actuator arm 340, and thus the rotational velocity of actuator 340 and the seek times for the drive.

The force on a current carrying wire in a magnetic field is proportional to the magnetic field intensity, and is expressed by the equation $\vec{F} = id\,\vec{1} \times \vec{B}$, where $\vec{F}$ is the force, i is the current, $\vec{1}$ is the length of the wire, and $\vec{B}$ is the magnetic field. Passing a current in opposite directions in actuator coil 342 provides respective forces $\vec{F}_1$ and $\vec{F}_2$ (FIG. 5); these forces $\vec{F}_1$ and $\vec{F}_2$ pivot actuator arm 340 in opposite directions about an axis passing through the center of bearing assembly 362.

Actuator arm 340 may be fabricated of magnesium, including all of the components attached thereto, is precisely balanced, i.e., equal amounts of weight are provided on either side of the pivot point so that the positioning of heads 326 is less susceptible to linear shock and vibration.

Figure 4:
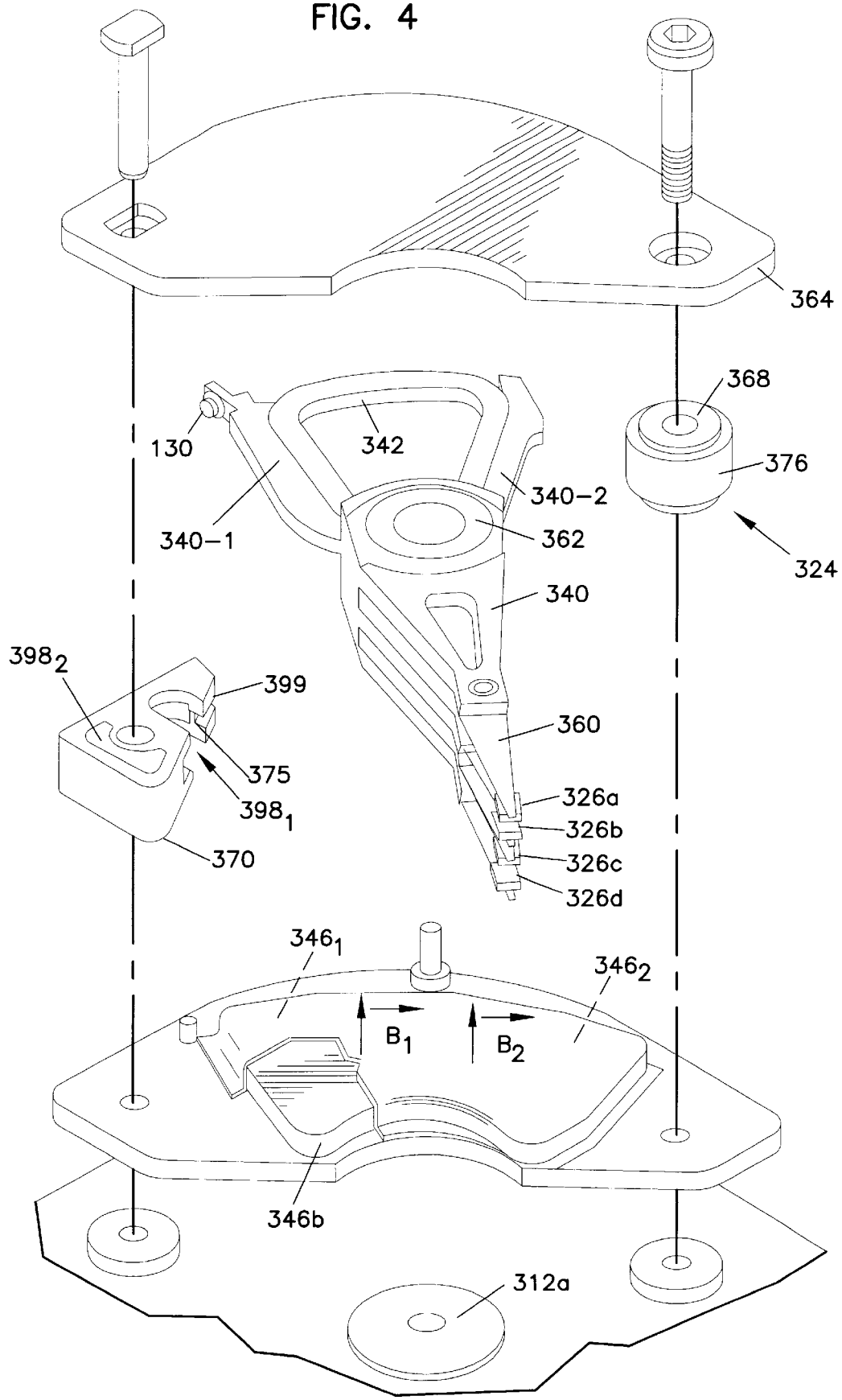
FIG. 4 is an exploded, partial view of the actuator assembly of the disk drive of the present invention.
Figure 5:
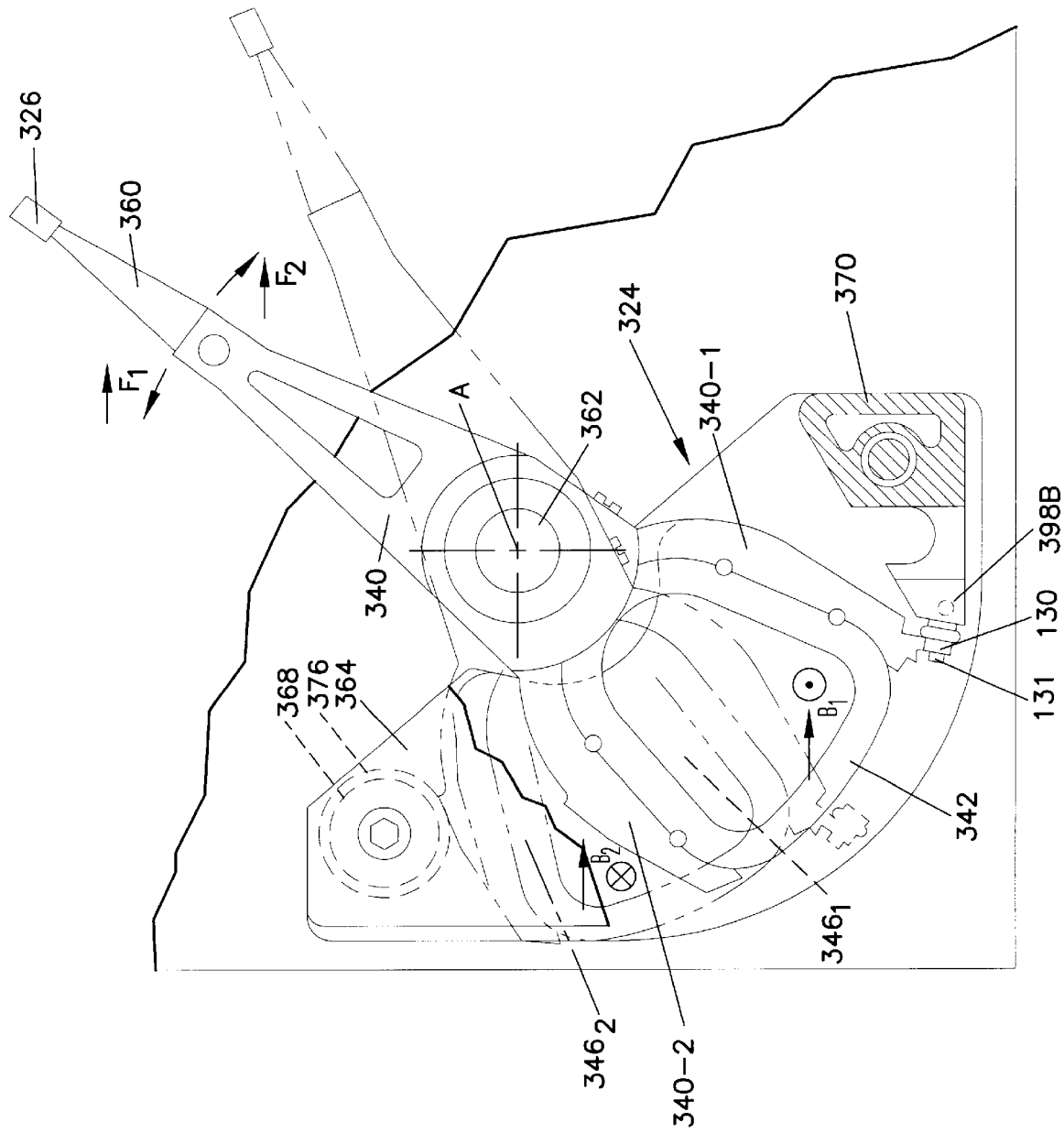
FIG. 5 is a partial plan view of the actuator assembly of the present invention.
Figure 9:
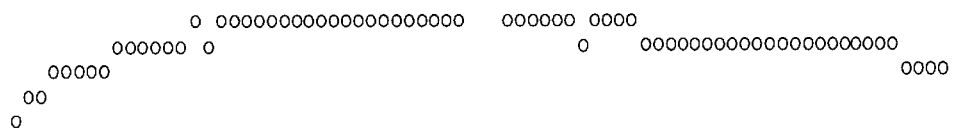
FIG. 9 is a graph representing the relative magnitude of the torque exerted on an actuator arm by the voice coil motor of the first embodiment of the disk drive of the present invention over the full stroke of the actuator's movement from the inner diameter to the outer diameter of the disk.
Figure 10:
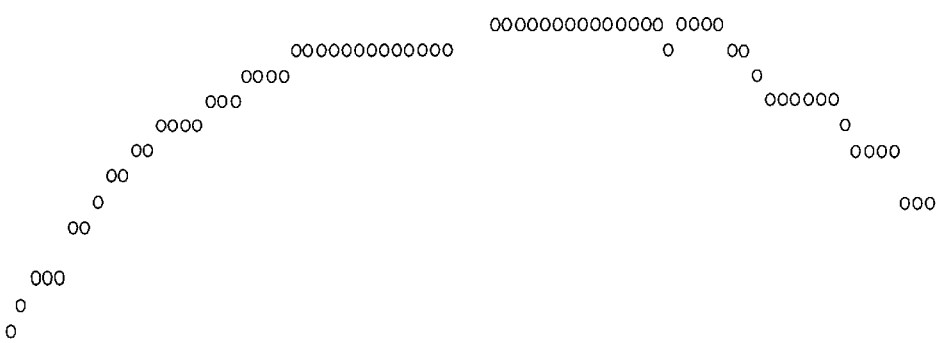
FIGS. 10–11 are graphs representing the relative magnitude of the torque exerted on an actuator arm by the voice coil motor of the second embodiment of the disk drive of the present invention over the full stroke of the actuator's movement.
Figure 11:
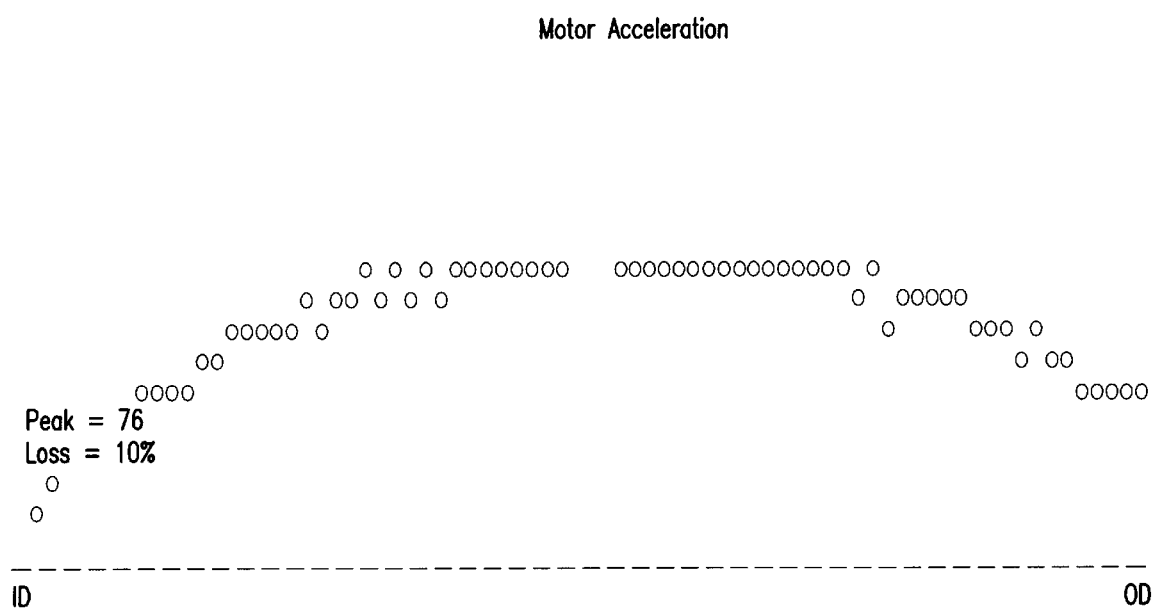

Testing of the voice coil motors of conventional disk drives has shown that the magnetic field strength at the peripheral portions of actuator magnets is less than the magnetic field strength at the central portion of actuator magnet. Presumably, this is because the direction of magnetic flux between plates 364,366 near the central portion of magnets 346a, 346b is essentially vertical, as shown in FIG. 4 by magnetic field vectors $\vec{B}_1$ and $\vec{B}_2$. As one moves outward from the line of division between regions 346, and $346_2$ toward the periphery of the magnet (sides 347-1 and 347-2), the direction of the magnetic flux tends to become nonperpendicular with respect to the surface of magnets 346a, 346b. This has the effect of reducing the torque exerted by the voice coil motor on the actuator arm 340 when the arm is moving toward the innermost track 295 or outermost track 296. FIGS. 9, 10, and 11 show that the torque generated by the voice coil motor in the first (FIG. 9) and second (FIGS. 10–11) embodiments of the present invention decreases as actuator arm 340 positions heads 326 at inside diameter track 295 and outside diameter track 296. FIG. 9 is a graph of the torque applied to actuator arm 340 of the disk drive of the first embodiment of the present invention upon acceleration of arm 40 in response to a seek command from controller 327. As shown in FIG. 9, the loss recorded at the inside and outside diameter position of heads 326a–326d is approximately 6% for the drive tested. Experimental results on a number of similar drives a typical loss at the inside and outside diameters of approximately 10%.

FIGS. 10 and 11 are graphs showing the relationship between the torque applied on acceleration of the actuator arm 340 of the disk drive of the second embodiment of the present invention in relation to the position of heads 326 at the inside and outside diameter tracks of disk 320. As shown therein, the two drives tested show losses at the inside and outside diameters of the disk of approximately 12% and 10%, respectively.

To provide a greater efficiency for the actuator of the present invention, coil 342 and magnets 346a, 346b have been designed to provide both a greater effective area of coil 342 in the presence of the magnetic field $\vec{B}_1$ and $\vec{B}_2$, and a greater magnetic field intensity at the peripheral edges of the magnets.

Figure 12:
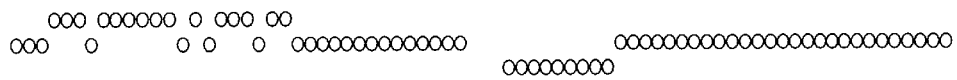
FIG. 12 is a graph representing the relative magnitude of the torque exerted on an actuator arm by the voice coil motor of the third embodiment of the disk drive of the present invention over the full stroke of the actuator's movement.

FIG. 8 details the relationship between coil 342 and actuator magnet 346b as such, top plate 364 has been removed. It should be generally understood that the following principles, described in conjunction with magnet 346b, apply equally to magnet 346a provided on top plate 364. In order to compensate for torque losses at the inner diameter and outer diameter, the surface area of magnet 346b is appreciably increased with respect to the actuator magnets shown in the first and second embodiments of the present invention. Specifically, magnet 346b includes a greater surface area at the respective ends 347-1 and 347-2 of the magnet, over which the portions of coil 324 adjacent arms 340-1, 340-2 are positioned when heads 326 are at inside diameter 295 or outside diameter 296 of disk 320. The curvature of magnet edge 348, positioned closest the axis of rotation of actuator 340, is extremely pronounced, and results in the formation of regions 349, and $349_2$ between edges 347-1 and 347-2 of magnet 346b and the axis of rotation of actuator body 340. The arcuate shape of magnet edge 348 is such that it has a near tangential relationship with respect to edges $324_3$ and $324_4$ of coil 324, and is defined to have a constant radius "X" with respect to "B", adjacent magnet 346b. In one configuration, radius "X" is approximately 0.387 inch. Magnet 346b also includes an outer edge 345, comprising first and second edges $345_1$ and $345_2$, meeting, at an angle, at the division of regions $346_1$ and $346_2$ of magnet 346b. As will be noted from an examination of FIG. 12, only the linear, uncurved portions of coil 342 overlie magnets 346a and 346b in the second embodiment. In the third embodiment of the present invention, coil 342 has been modified so that more coil area is provided over the major surface of magnet 346. Specifically, in the disk drive of the second embodiment of the present invention, approximately 35% of the coil area is utilized; in the third embodiment, coil area utilization is increased to approximately 43%. Thus, a greater amount of coil area is provided in magnetic fields $\vec{B}_1$ and $\vec{B}_2$, therefore providing greater efficiency in the voice coil motor of the third embodiment of the present invention and greater torque on actuator arm 340. Specifically, it is estimated that, due to both the improvement in the shape of magnets 346a, 346b and the shape of coil 342, having a small curved area close to actuator pivot point "A", the usable area of the coil is increased in this embodiment to approximately 43%. Further, because of the increased field strength provided by the greater surface area of magnet 346b near magnet ends 347-1 and 347-2, the drop off associated with the acceleration torque in the first and second embodiments of the present invention is reduced. As shown in FIG. 12, the acceleration torque has a greater "linearity" than the acceleration torque shown in FIGS. 9–11. That is, the torque profile of the voice coil motor of the third embodiment is nearly linear between the inner diameter and the outer diameter, exhibiting less of an arcuate shape than the profiles depicted in FIGS. 9–11. Magnetic flux and torque loss associated with the positioning of the heads at the inner or outer diameters is markedly reduced, resulting in a total loss of torque of about 3% for the drive tested with respect to FIG. 12.

The actuator design of the present invention results in an improvement of approximately 4.7% in access time.

Crash stops are provided to limit the pivoting movement of actuator arm 340 so that heads 326 travel only between selected inside and outside diameters 295, 296 of disk 320. An outside diameter crash stop is provided by a sleeve 376 (FIGS. 4, 5, and 8) fitted on support post 368. When the pivoting motion of actuator arm 340 places heads 326 at the outside diameter 296 of disk 320 portion 242 of actuator arm 340-2 contacts outside diameter crash stop 376, thereby preventing further movement of the heads 326. An inside diameter crash stop is provided by the portion of the latch mechanism and is described below.

A latch mechanism for locking actuator arm 340 will be described with reference to FIGS. 2–8.

The latch mechanism of the disk drive of the present invention utilizes the force of the voice coil actuator magnets 346a and 346b to provide the magnetic retentive force for the latching actuator 340.

As can be seen in FIGS. 2–8, a capture pin 130 formed of magnetically permeable material is provided in latch arm 340-1. Latch support structure 370 is designed so that the magnetic circuit formed by actuator magnets 346a and 346b provides a flux path through structure 370. Voids 398-1 through 398-4 are formed in structure 370 to channel the magnetic flux from magnets 346a and 346b to air gap 399. Specifically, air gap 399 has a width W of approximately 0.012 inches. Capture pin 130 is generally "T"-shaped, including portion 131 extending through a bore in actuator latch arm 340-1 and secured thereto by a snap ring (not shown.) The magnetic flux provided by magnets 346a and 346b and channeled through support structure 370 exhibits a fringing effect when the flux encounters gap 399. When actuator 340 is directed to position heads 326 over the landing zone at inner diameter 295, capture pin 130 is drawn into abutment with tabs 398a and 398b of structure 370. As pin 130 engages tabs 398a, 398b, the magnetic flux provided by magnets 346a and 346b passes through pin 130, making pin 130 part of the magnetic circuit formed by structure 370 and magnets 346a, 346b.

The latching force provided by the this latching mechanism is 50–60 inchgrams. The amount of latching force may be adjusted by providing a shunt 375 (FIG. 4) across gap 399 to provide a flux path in parallel with the flux fringing about gap 399. Generally, there is no need for an additional latch magnet to provide the requisite magnetic latching and releasing forces for the actuator. Actuator assembly 324 can generate sufficient force to release actuator arm 340 from the latched position. The strength of the latching force is sufficient to retain the actuator in a captured position under non-operating shocks of up to 75 G's.

Table 2 specifies certain performance characteristics of disk drive 300.

TABLE 2

Seek Times

| Track to Track | 3 msec |
|---|---|
| Average | 12 msec |
| Maximum | 25 msec |
| Rotation Speed (±.1%) | 4491 RPM |
| Data Transfer Rate To/From Media | 20 MByte/sec |
| Interleave | 1-to-1 |

Table 3 specifies certain environmental characteristics of disk drive 300.

TABLE 3

| Temperature | |
|---|---|
| Operating | 5° C. to 55° C. |
| Non-operating | −40° C. to 60° C. |
| Thermal Gradient | 20° C. per hour maximum |
| Humidity | |
| Operating | 8% to 80% non-condensing |
| Non-operating | 8% to 80% non-condensing |
| Maximum Wet Bulb | 26° C. |
| Altitude (relative to sea level) | |
| Operating | −200 to 10,000 feet |
| Non-operating (max.) | 40,000 feet |

Table 4 specifies shock and vibration tolerances for disk drive 200. Shock is measured utilizing a ½ sine pulse, having a 11 msec duration, and vibration is measured utilizing a swept sine wave varying at 1 octave per minute.

TABLE 4

| Non-operating shock | 75 G's |
|---|---|
| Non-operating vibration 63–500 Hz | 4 G's (peak) |
| Operating shock | 5 G's (without non-recoverable errors) |
| Operating vibration 28–500 HZ | .5 G's (peak) (without non-recoverable errors) |

The many features and advantages of the disk drive of the present invention will be apparent to those skilled in the art from the Description of the Preferred Embodiments. For example, those skilled in the art will appreciate that the structure of the disk drive of the present invention as described herein can be scaled for use with disk drives having disks with smaller and larger than 3½ inches. Thus, the following claims are intended to cover all modifications and equivalents falling within the scope of the invention.

What is claimed is:

1. A parking device for an actuator in a storage device, the storage device including a voice coil motor having a voice coil magnet, providing a magnetic field including a magnetic flux, and a coil coupled to the actuator, comprising:

a magnetically permeable capture structure receiving the magnetic flux from the voice coil magnet and including means for directing the magnetic flux adjacent to the capture structure; and a capture member, having a face plate, coupled to the actuator such that the capture member enters the magnetic flux from the voice coil magnet to park the actuator when the actuator is in a park position and the face plate lies in contact with the capture structure.

2. The parking device according to claim 1 wherein the storage device includes a magnet structure supporting the magnet, having a top plate and a bottom plate, wherein the capture structure is positioned between the top and bottom plates and forms a magnetic circuit path for the magnetic flux with the magnet, and the top and bottom plates.

3. The parking device according to claim 2 wherein the magnet structure comprises a support post member including an air gap to generate a fringe effect in the magnetic flux to provide the capture region and includes cavities such that the circuit path formed by the structure channels the magnetic flux to the air gap.

4. An actuator assembly for a disk drive, said drive including at least one magnetic disk, comprising:

an arm assembly having a first end and a second end, said first end holding at least one read/write head, and said assembly rotating about an axis to position said at least one head with respect to the disk;

a voice coil magnet for providing a magnetic field, said magnet having a generally arcuate shape first major surface, said magnetic field having direction and magnitude;

a coil, provided on said second end of said arm assembly and positioned in the presence of said magnetic field such that a current passing through said coil generates a second magnetic field to position said actuator arm assembly with respect to said disk; and parking means for securing the actuator in a secured position when no current is present in the coil, including:

a latch support structure including an air gap and being comprised of a magnetically permeable material positioned adjacent the voice coil magnet, such that the latch support structure channels magnetic flux provided by the voice coil magnet to an area in and around the air gap, the air gap being positioned adjacent to the second end of the arm assembly, and a capture member coupled to the second end of the actuator which enters the magnetic flux around the air gap and contacts the latch support structure on a first side and a second side of the air gap to latch the actuator.

5. The voice coil actuator of claim 4 wherein the latch support structure includes a shunt which forms a parallel flux path for magnetic flux impinging the air gap.

6. The voice coil actuator of claim 4 wherein the gap has a width of about 0.012 inch.

7. The voice coil actuator of claim 4 wherein the magnetic flux of the magnet impinges upon the gap and forms a magnetic capture region through fringing about the gap, and wherein the actuator is latched when the capture pin enters the capture region and abuts the gap such that the flux passes through the capture pin forming a circuit between with pin and the mounting structure.

8. A disk drive responsive to a host computer, comprising:

a base plate;

a disk rotatably mounted on said base plate, said disk having a landing zone;

transducer means for reading information from and writing information on said disk;

an actuator arm pivotally supported on said base plate, said actuator arm having a first end for supporting said transducer means and a second end disposed on the opposite side of said pivotal support from said first end;

a magnetically permeable capture member mounted on said actuator arm;

a voice coil magnet for providing a magnetic field extending around said second end of said actuator arm, the magnetic field including magnetic flux;

a coil, supported by said second end of said actuator arm and lying in a plane substantially parallel to said disk, for passing an electric current in the magnetic field; and a latch body mounted adjacent to the actuator arm, the latch body forming a magnetic circuit with the voice coil magnet and including an air gap defined by first and second portions, and in the magnetic circuit, the latch body magnetically interacting with said capture member when said capture member abuts said first and second portions, and said gap, to park said transducer means.

9. A disk drive according to claim 8 wherein said latch body further includes a shunt in parallel with the gap, the shunt providing a parallel magnetic path with the gap for the magnetic flux.

10. A disk drive according to claim 9 wherein said magnetic flux is substantially contained within the latch body and a portion of said magnetic flux extends a predetermined distance beyond said latch body at said gap into a capture region.

* * * * *